United States Patent [19]

Stamer et al.

[11] Patent Number: 5,583,544
[45] Date of Patent: Dec. 10, 1996

[54] LIQUID LEVEL SENSOR FOR INK JET PRINTERS

[75] Inventors: Michael E. Stamer, Lincolnwood; Colin Sharpe, South Elgin, both of Ill.

[73] Assignee: Videojet Systems International, Inc., Niles, Ill.

[21] Appl. No.: 319,264

[22] Filed: Oct. 6, 1994

[51] Int. Cl.$^6$ .................................................. B41J 2/195
[52] U.S. Cl. ........................................................ 347/7
[58] Field of Search ........................ 347/7, 86; 73/304 R, 73/861.08, 861.12; 29/612

[56] References Cited

U.S. PATENT DOCUMENTS

| | | | |
|---|---|---|---|
| 2,230,137 | 1/1941 | Ewertz . | |
| 3,853,005 | 10/1974 | Schendel | 324/643 |
| 3,914,862 | 10/1975 | McBride et al. | 29/612 |
| 4,059,016 | 11/1977 | Kitzinger et al. | 73/304 R |
| 4,196,625 | 4/1980 | Kern | 347/7 |
| 4,284,343 | 8/1981 | Junghanns | 73/304 R |
| 4,361,038 | 11/1982 | Schuler | 73/295 |
| 4,382,382 | 5/1983 | Wang | 73/304 R |
| 4,476,472 | 10/1984 | Aiba et al. | 347/86 |
| 4,503,383 | 3/1985 | Agar et al. | 324/663 |
| 4,555,712 | 11/1985 | Arway et al. | 347/7 |
| 4,580,143 | 4/1986 | Larsen | 347/7 |
| 4,590,893 | 5/1986 | Hirano | 123/41.21 |
| 4,827,280 | 5/1989 | Stamer et al. | 347/6 |

FOREIGN PATENT DOCUMENTS

| | | |
|---|---|---|
| 0008095 | 2/1980 | Germany . |
| 2017933 | 10/1979 | United Kingdom . |
| WO8302824 | 8/1983 | WIPO . |

OTHER PUBLICATIONS

Patent abstracts of Japan, vol. 7 No. 196 (p. 219) Aug. 26, 1983 and JP, A, 58 095218 (Zoujirushi Mahoobin K.K.) Jun. 6, 1983 see abstract.

*Primary Examiner*—Benjamin R. Fuller
*Assistant Examiner*—L. Anderson
*Attorney, Agent, or Firm*—Rockey, Rifkin and Ryther

[57] ABSTRACT

The ink level sensor of the invention comprises an ink container having a generally cylindrical shield extending downward from its top to define shielded and unshielded compartments within the container. Ink, but not foam, froth or mist, flows under the shield to the shielded compartment. A plurality of conductive rods of differing length extend downwardly into the shielded compartment from the container top. The rods are connected to an impedance network which provides signals representative of the ink level inside the container. A vacuum source can be connected to each compartment to maintain pressure equilibrium in the compartments and to prevent foam, froth or mist from entering the shielded compartment. Alternatively, a return pump is used to force ink into the container such that each compartment can be vented to the atmosphere.

13 Claims, 3 Drawing Sheets

LIQUID LEVEL SENSOR FOR INK JET PRINTERS

BACKGROUND OF THE INVENTION

The present invention relates generally to ink jet printers and, more particularly, to an apparatus for sensing discrete liquid levels in an ink jet printing system and for maintaining satisfactory operation thereof.

In one type of ink jet printing system, a supply of an electrically conductive ink under pressure is subjected to vibratory energy to create a jet of regularly spaced drops. The drops are selectively charged by charging electrodes and pass through an electrostatic deflection field created by a pair of high voltage plates. The drops follow differing trajectories depending on the level to which the drops are individually charged. Certain drops are deposited on the substrate to form the image, while the remaining drops are intercepted by a catcher to be recirculated. See, for example, U.S. Pat. No. 4,555,712 and 4,827,280. An ink reservoir is included in such systems to collect ink deposited in the catcher for reuse.

Reservoirs 54 or 85 in the '712 patent and reservoir 12 in the '280 patent each serve as a holding tank for ink which is transferred to the pressure cylinder to be delivered under pressure to the nozzle. Ink which is collected by the catcher typically loses solvent content that is replenished periodically by adding makeup fluid into the reservoir. Also, fresh ink is added periodically to replace the ink consumed during printing. The reservoir serves as a mixing chamber for all of these fluids such that the level of fluid in the reservoir constantly changes.

While ink is transferred to the pressure cylinder and makeup fluid and fresh ink are added, the fluid level in the reservoir can be sensed at several specific points, including (i) a lowest fluid or ink level, below which makeup fluid should be added to avoid exhausting the supply of ink; (ii) an intermediate fluid level, identified as the "reservoir full" state; and (iii) an upper fluid level, identified as an "overfull" state which causes immediate shut-down of the printing system.

One method of sensing fluid levels is to use a float containing a magnet. The float rises and falls with the liquid level and its relative position is detected at specific heights by magnetic sensors such as magnetic reed switches or other magnetically activated devices. Magnetic floats and reed switches have commonly been used for many years in the art of ink jet printing.

There are reliability problems with such float based sensors in the reservoir. Accurate liquid level sensing from system to system can be difficult to achieve in the manufacturing process due to the variation in magnet strength, switch sensitivity and variations in the positional relationship between the two varying as the float moves over extended use. There is an uncertainty in knowing the fluid level whenever the float is between switches. Dried ink in a printer which has been inoperative for an extended period of time can cause a float to stick in a fixed position.

The problems with floats can be avoided by utilizing a plurality of electrically conductive rods to ascertain the level of the conductive liquid ink in a reservoir or container. However, the use of such rods is affected by ink froth, foam and mist in the ink reservoir or container. Because the froth, foam and mist are electrically conductive, the level sensing rods can be shorted together, thereby allowing erroneous liquid level measurements to be made.

What is desired is an improved liquid level sensor capable of providing accurate measurements of liquid levels in ink jet printing systems. More specifically, an improved ink level sensor which avoids the inaccuracies resulting from frothing, spattering, foaming and misting is desired.

SUMMARY OF THE INVENTION

The present invention is an ink level sensor assembly for use in an ink jet printing system. The invention comprises an ink container having disposed therein a generally cylindrical shield extending downward from the top of the container to define shielded and unshielded compartments within the container. When ink enters the unshielded compartment, a layer of electrically conductive foam and mist may be created on top of the liquid ink layer. The bottom of the shield extends below the minimum operating liquid ink level such that only liquid ink, not foam, froth or mist, enters the shielded compartment.

A plurality of conductive rods of differing lengths extend downwardly into the shielded compartment to contact the liquid ink contained therein. The rods are connected to an impedance network which provides a series of output signals representative of the ink level inside the shielded compartment.

A vacuum source is independently connected to both compartments to draw ink into the container and to prevent the spread of ink foam and mist into the shielded compartment.

The vacuum source equalizes the pressure in both compartments, thereby maintaining the ink level in each compartment the same. Alternatively, a return pump may be utilized to force ink into the container. In this case, both the shielded and unshielded compartments are vented to the atmosphere to equalize the pressure in the compartments.

DESCRIPTION OF THE INVENTION

Figure 1:
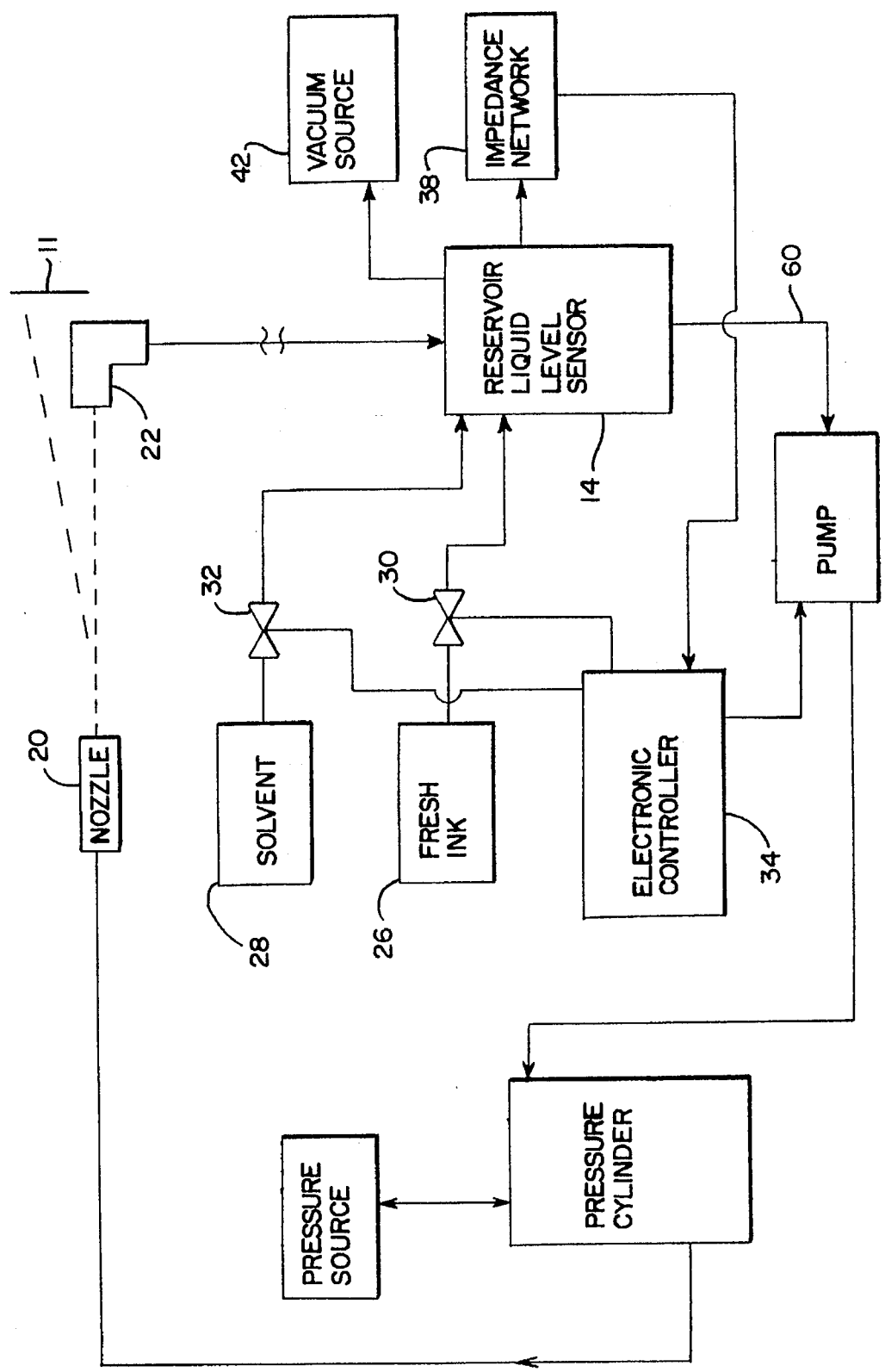
FIG. 1 is a diagram of an ink jet printing system which incorporates the liquid level sensor of the present invention.

Referring to FIG. 1, a diagram of an ink jet printing system which incorporates the improved liquid level sensor of the invention is illustrated. Reference can be made to the aforementioned '712 and '280 patents for specific details of the operation of the printing system, a summary thereof being presented hereafter.

Pressurized ink is supplied to nozzle 20 which creates a jet of ink drops to be deposited on a substrate 11 to be marked. The ink that is not deposited on the substrate is collected by catcher 22 and returned to reservoir 14. Valves 30 and 32 are selectively operated by electronic controller 34, responsive to signals from impedance network 38, to add fresh ink 26 and/or solvent 28 to reservoir 14. Impedance network 38 generates signals indicative of the ink level inside reservoir 14 and vacuum source 42 applies negative pressure to reservoir 14.

Figure 2:
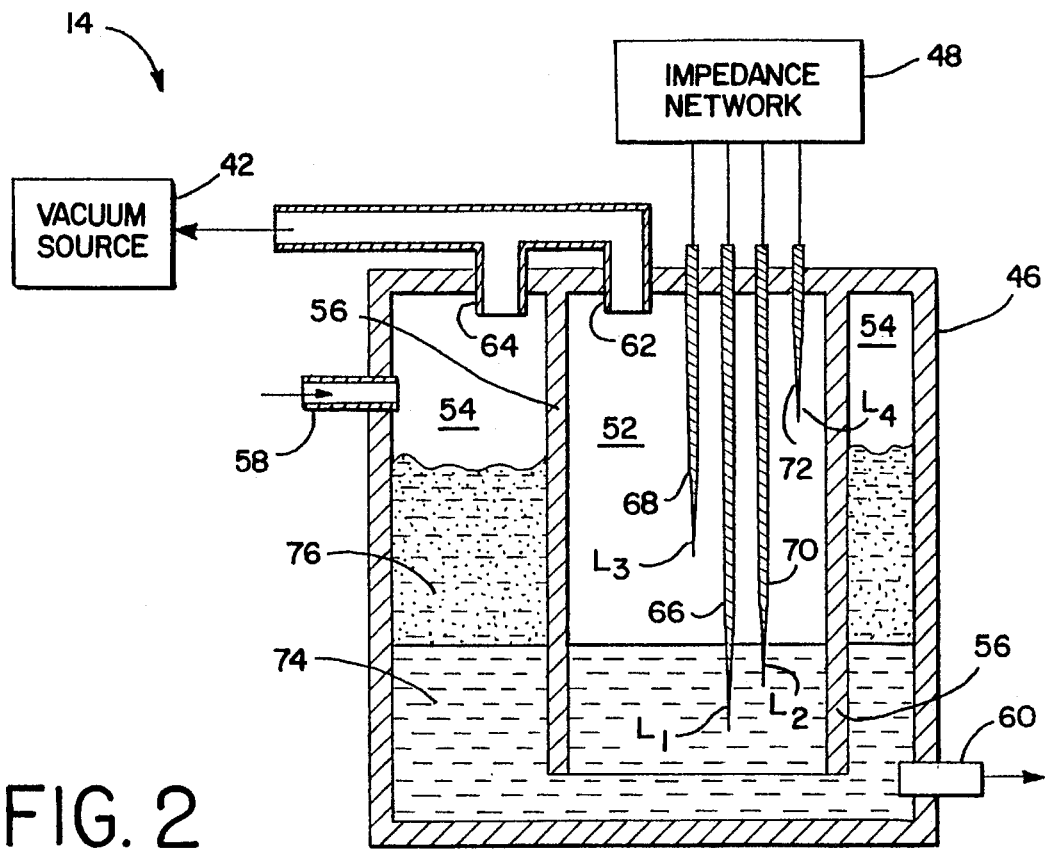
FIG. 2 is a sectional view of the liquid level sensor of the invention.

Referring to FIG. 2, a sectional view of the improved liquid level sensor 14 of the invention is illustrated. The liquid level sensor comprises an ink container 46 having a shield 56 downwardly extending from its top to define shielded and unshielded compartments 52 and 54. Shield 56 is generally cylindrical, although any shape of shield could be utilized to define shielded and unshielded compartments 52 and 54. Note that the shield 56 terminates at a point above the bottom of the container permitting the liquid to flow between the compartments. The point at which the shield terminates is below the minimum operating liquid level in the container.

Ink enters the container 46 from catcher 22 via an inlet 58 communicating with the unshielded compartment 54. From compartment 54, liquid ink flows under the shield 56 to enter the shielded compartment 52 and exits container 46 via outlet 60. Compartments 52 and 54 are connected to a vacuum source 42 via outlets 62 and 64. Both compartments 52 and 54 are kept at the same pressure by vacuum source 42 to maintain the same ink level in both compartments of container 46. Vacuum source 42 provides continuous air flow from inlet 58 through the unshielded compartment 54 to ensure that any foam, froth or ink mist which collects in the unshielded compartment is drawn toward the vacuum source, thus preventing migration thereof to the shielded compartment.

Figure 3:
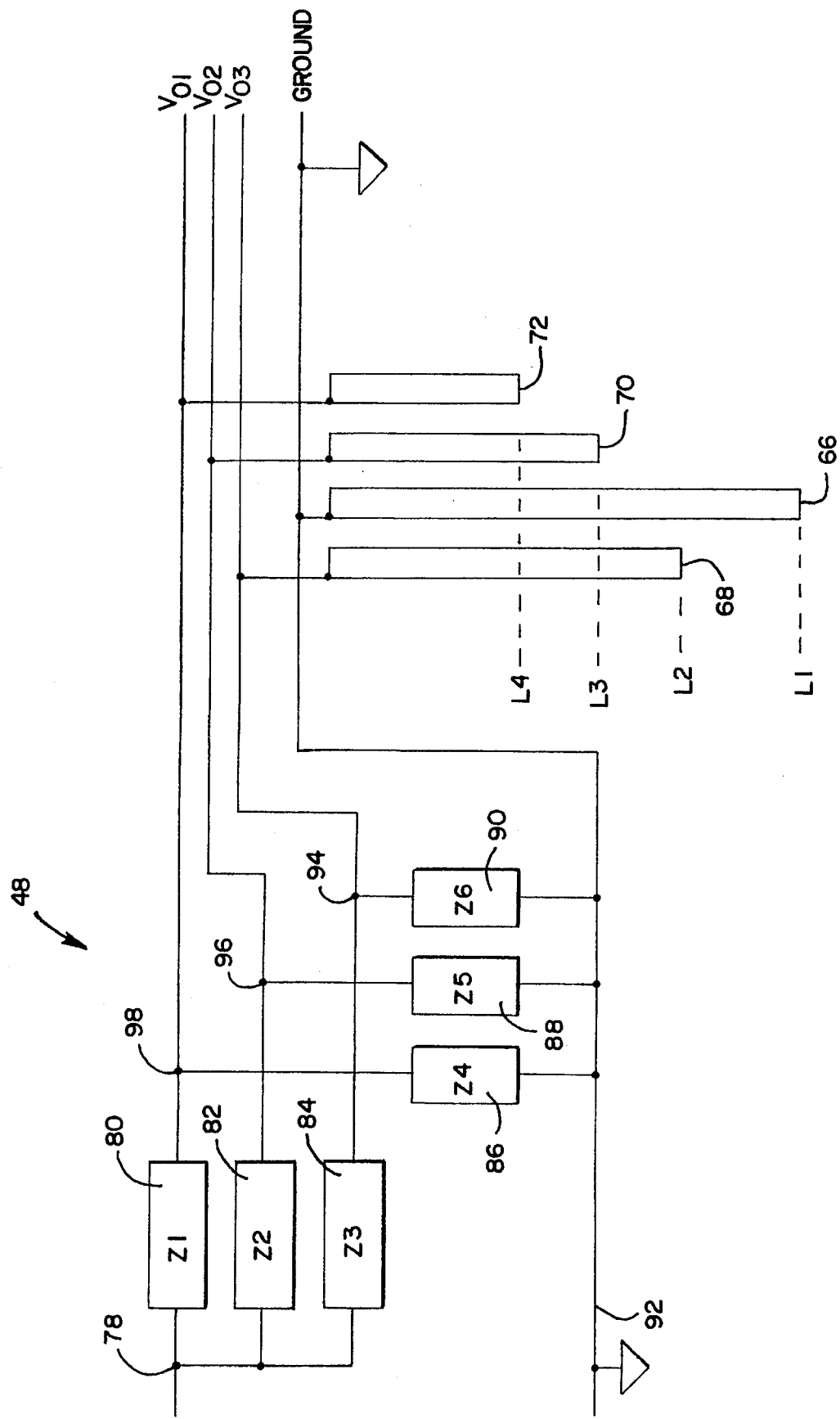
FIG. 3 is a schematic diagram of the impedance network associated with the liquid level sensor of FIGS. 2 and 2A.

A plurality of electrically conductive sensor rods of differing lengths downwardly extend into the shielded compartment 52 from the enclosed top of container 46. The rods, when immersed in the conductive ink 74, are shorted together. As shown in FIGS. 2 and 3, rods 66–72 downwardly extend to levels L1–L4 and are connected to an impedance network 48 to provide signals representative of the liquid level inside the container. Preferably, rods 66–72 are corrosion resistant, have pointed, not blunt ends and are constructed from stainless steel or a conductive plastic. It must be noted that any number of conductive rods can be used and that the ground rod may be replaced by a conductive shield or conductive container suitably connected to the impedance network 48.

During system operation, a foam layer 76 and ink mist may develop above the liquid ink layer 74 inside container 46. To avoid interference from the electrically conductive froth 76 and mist, rods 66–72 are positioned within the shielded chamber so that precise measurement of the ink levels inside of the container is possible. The shield 56 preferably fully surrounds the rods 62–72. Alternatively, the electrical ground rod may be placed outside the shield.

Figure 2A:
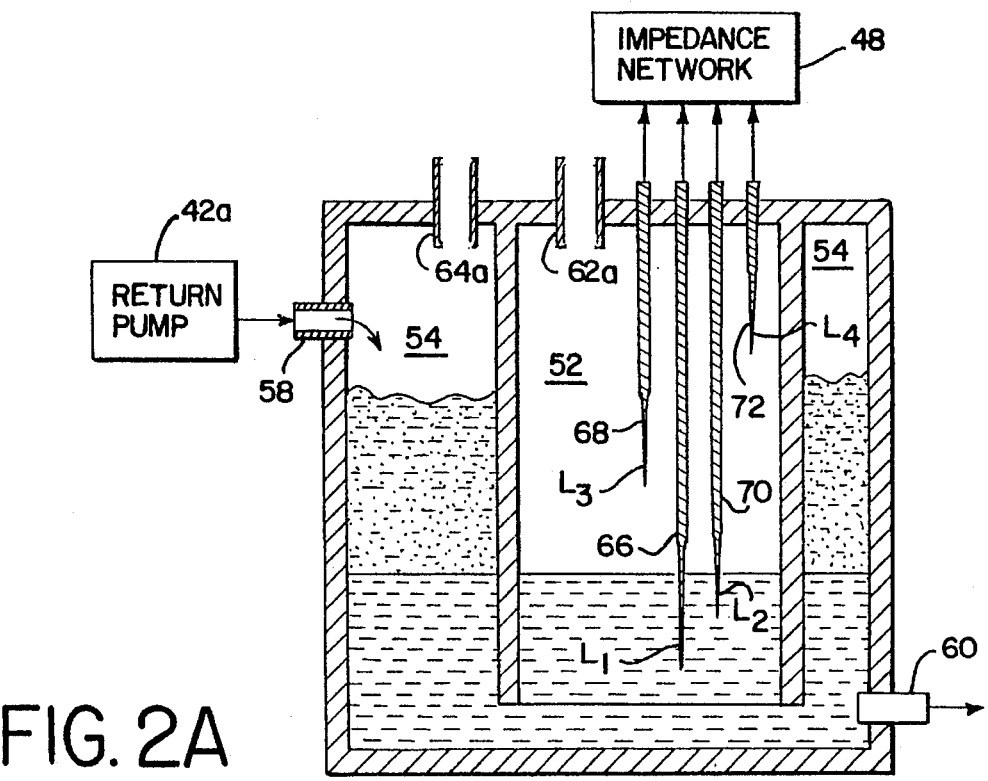
FIG. 2A is a sectional view of a second embodiment of the liquid level sensor of the invention.

Referring to FIG. 2A, a second embodiment of the liquid level sensor of the invention is illustrated. A return pump 42a is used to force ink from gutter 22 into container 46 via inlet 58 instead of vacuum source 42 drawing ink into container 46 as disclosed with reference to the embodiment of FIG. 2. In the FIG. 2A embodiment, outlets 62a and 64a are vented to the atmosphere to equalize the pressure in the shielded and unshielded compartments 52 and 54. In all other respects, the embodiment of FIG. 2A corresponds to the embodiment shown in FIG. 2.

FIG. 3 is a schematic diagram which shows the electrical connections of impedance network 48 and the rods 66–72. The impedance network 48 includes resistors, capacitors, the impedance of the rods 66–72 themselves and of the fluid. An input voltage is applied at node 78. Current flows from node 78 to ground 92 through three voltage divider circuits, each comprising one input impedance Z1–Z3 (80–84) and one output impedance Z4–Z6 (86–90). The set of output voltages $VO_1$, $VO_2$, $VO_3$ from the three divider circuits is measured at nodes 94, 96 and 98.

Conductive rods 66–72 are connected to nodes 92–98 respectively such that the output impedances Z4–Z6 are successively shunted to ground as the level of ink inside the shielded compartment rises thereby to provide four different sets of output voltages at nodes 94–98.

As rods 66–72 are successively shorted together by the conductive liquid ink, different sets of voltages appear at nodes 94–98. When the ink level is below L2, none of the output impedances Z4–Z6 are shunted to ground. When the ink is at level L2, rod 68 and output impedance Z6 are shunted to ground by the conductive ink. When the ink reaches level L3, rods 68 and 70 and output impedances Z5 and Z6 are shunted to ground. Finally, when the ink is at level L4, all of the rods 66–72 and all of the output impedances Z4–Z6 are shunted to ground. In this way, the level of ink in the container 46 can be precisely monitored.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A sensor for measuring a level of an electrically conductive liquid comprising:

a) an enclosed container having an inlet, an outlet, a button and a shield secured to and extending downwardly from a top portion of said container to a position short of the container bottom thereby to define shielded and unshielded compartments, said conductive liquid entering said unshielded compartment through said inlet and being permitted to flow under said shield to the shielded compartment while any foam, froth or mist present in said container is retained in said unshielded compartment;

b) a plurality of conductive rods of differing lengths extending downwardly into the shielded compartment for contact with the liquid;

c) circuit means, connected to said rods, for generating output signals representative of the liquid level in the shielded compartment; and d) means for equalizing pressure between said shielded and unshielded compartments to ensure that foam, froth and mist do not enter said shielded compartment, said means for equalizing including a vacuum source communicating with both of said compartments to maintain equal, below atmospheric pressure in said compartments.

2. The liquid level sensor of claim 1 wherein said circuit means comprises a number of voltage divider circuits one less than there are conductive rods.

3. The liquid level sensor of claim 1 wherein said shield extends to a point below a minimum operating liquid level in said container.

4. The liquid level sensor of claim 1 wherein said shield is generally cylindrical in shape.

5. A sensor for measuring a level of an electrically conductive liquid comprising:

a) an enclosed container having an inlet, an outlet, a button and a shield secured to and extending downwardly from a top portion of said container to a position short of the container bottom thereby to define shielded and unshielded compartments, said conductive liquid entering said unshielded compartment through said inlet and being permitted to flow under said shield to the shielded compartment while any foam, froth or mist present in said container is retained in said unshielded compartment;

b) a plurality of conductive rods of differing lengths extending downwardly into the shielded compartment for contact with the liquid;

c) circuit means, connected to said rods, for generating output signals representative of the liquid level in the shielded compartment; and d) means for equalizing pressure between said shielded and unshielded compartments to ensure that foam, froth and mist do not enter said shielded compartment, said means for equalizing comprising vent means, for separately venting each of the said compartments to atmospheric pressure.

6. A liquid level sensor for measuring a level of conductive ink in an ink jet printing system including an ink reservoir, a nozzle supplied by said reservoir, a supply of make-up ink and a controllable valve by which make-up ink is added to said reservoir comprising:

a) an enclosed container having an inlet, an outlet, a button and a shield secured to and extending downwardly from a top portion of said container to a position short of the container bottom thereby to define shielded and unshielded compartments, said conductive ink entering said unshielded compartment through said inlet and being permitted to flow under said shield to the shielded compartment while any foam, froth or mist in said container is retained in said unshielded compartment;

b) a plurality of conductive rods of differing lengths downwardly extending from said top into the shielded compartment;

c) circuit means, connected to said rods, for generating output signals representative of the conductive ink level inside the container; and d) means for equalizing pressure between said shielded and unshielded compartments to insure that foam, froth and mist do not enter said shielded compartment, said means for equalizing including a vacuum source communicating with both of said compartments to maintain equal, below atmospheric pressure in said compartments.

7. The ink level sensor of claim 6 wherein said circuit means comprises a number of voltage divider circuits one less than there are conductive rods.

8. The ink level sensor of claim 6 wherein said shield extends to a point below a minimum operating ink level in said container.

9. The ink level sensor of claim 6 wherein said shield is generally cylindrical in shape.

10. A sensor for measuring a level of electrically conductive ink in a container having a top and a bottom, said container receiving ink mixed with air, said sensor comprising:

a) a shield secured to and extending downwardly from said top of the container to a position short of the container bottom to define an unshielded compartment and a shielded compartment, said ink being permitted to flow under said shield to the shielded compartment while any ink foam, froth or mist is retained in said unshielded compartment;

b) at least two conductive rods of differing length which extend downwardly from the container top into the shielded compartment;

c) circuit means, connected to said rods, for generating signals representative of the ink level inside the container; and d) air outlet means, communicating with said shielded and unshielded compartments, for i) providing air flow through the unshielded compartment to prevent the entry of foam, froth or ink mist into said shielded compartment and ii) maintaining equal pressure in said shielded and unshielded compartments.

11. The sensor of claim 10 wherein said circuit means comprises a number of voltage divider circuits one less than there are conductive rods.

12. The sensor of claim 10 wherein said shield extends to a point below a minimum operating ink level in said container.

13. The sensor of claim 10 wherein said shield is generally cylindrical in shape.

* * * * *